United States Patent [19] [11] 4,316,059
Toth [45] Feb. 16, 1982

[54] GAIN CONTROLLER FOR A TELECONFERENCING BRIDGE

[75] Inventor: Arpad G. Toth, Ottawa, Canada

[73] Assignee: Northern Telecom Limited, Montreal, Canada

[21] Appl. No.: 158,218

[22] Filed: Jun. 10, 1980

[51] Int. Cl.³ .............................................. H04M 3/56
[52] U.S. Cl. ............................ 179/1 CN; 179/18 BC
[58] Field of Search ......................... 179/1 CN, 18 BC; 370/62; 455/219, 232

[56] References Cited
U.S. PATENT DOCUMENTS 3,050,584  8/1962  Miller ............................. 179/1 CN
4,197,429  4/1980  Sparber .......................... 179/18 BC Primary Examiner—Raymond F. Cardillo, Jr.
Assistant Examiner—J. A. Popek
Attorney, Agent, or Firm—John E. Mowle

[57] ABSTRACT

A gain controller for normalizing signal levels from a plurality of remote stations connected to a teleconferencing bridge. Common monitoring circuitry is used to generate a clock signal, the duration of which is proportional to the magnitude of a test signal from the remote station. This clock signal in turn is stored in a separate binary counter, the output of which is used to individually control the amplifier gain in the channel connecting the remote station to the bridge.

4 Claims, 1 Drawing Figure

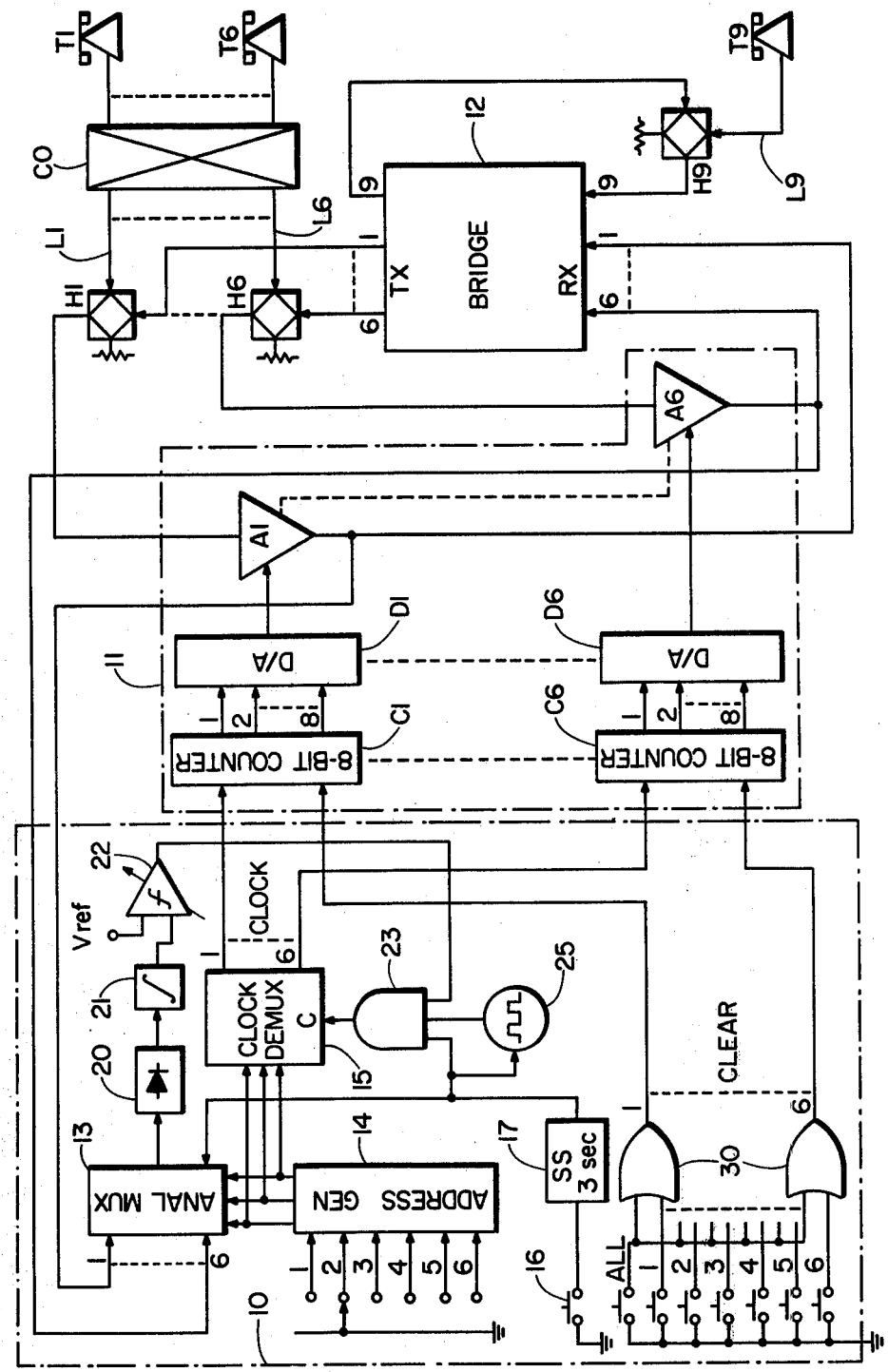

GAIN CONTROLLER FOR A TELECONFERENCING BRIDGE

This invention relates to a gain controller for use in conjunction with a teleconferencing bridge to normalize the received signal levels at the bridge ports utilizing common monitoring circuitry with individual level controllers associated with each input port of the bridge.

BACKGROUND OF THE INVENTION

One of the problems of audio bridges is that the operation of their voice operated loss control and switching circuit is very much dependent upon the received signal level at each input port to the bridge. If one of the received signal levels is low (because of a long transmission loop for example) compared to the others, it may well cause voice switching problems for its user during a conference call. The conferee either has to speak louder to increase his own signal level or has to suffer a degradation in terms of conference participation and satisfaction. This problem may be eliminated by bringing each bridge input port level to a normalized value using a level normalizing circuit within the bridge. One known arrangement for achieving this is to utilize individual automatic gain control circuits for each of the input ports to the bridge. While such an arrangement is very effective, it is expensive to implement due to the complete duplication of monitor and control equipment for each channel.

STATEMENT OF THE INVENTION

The present invention provides a cost effective arrangement for normalizing the signal levels of the various channel ports connected to the teleconferencing bridge which is relatively simple to operate with the cooperation of each of the participants to the conference call.

Thus, according to the present invention there is provided a gain controller for normalizing signal levels from a plurality of remote stations each of which is connected to a teleconferencing bridge. The gain controller comprises a signal multiplexer for connecting a test signal from a station to a signal lever detector in response to a selected channel address, to generate a control signal which is proportional to the level of the received test signal. The controller includes a demultiplexer which is also responsive to the selected channel address for connecting the control signal to a separate storage circuit associated with the remote station. Also included is an address generator for transmitting the selected channel address to the multiplexer and the demultiplexer. The controller includes separate variable gain amplifiers connecting each remote station to the teleconferencing bridge. The gain of each amplifier is proportional to the magnitude of the control signal stored in the associated storage circuit so as to normalize the gain of the channel connected to the teleconferencing bridge.

In a particular embodiment, the signal level detector generates a time dependent signal which in turn is used to control a clock driven counter. This results in the stored count in the counter being a measure of the magnitude of the detected signal level which in turn can be used to control the gain of the variable gain amplifier.

The test signal from the remote station can, in one embodiment, be a voice signal which is integrated over a selected period of time to obtain a signal output that is a measure of the received signal level. However, one relatively constant source of signal level is the push-button signalling tone which is generated during dialing. To utilize this tone, the controlling operator for the conference call would request the conferee at the remote station to operate one of the push-button signalling tones for a few second interval while the gain controller monitored the incoming signal level to the bridge so as to establish a level for control of the variable gain amplifier.

BRIEF DESCRIPTION OF THE DRAWING

An example embodiment of the invention will now be described with reference to the accompanying drawing in which a single FIGURE illustrates a block schematic diagram of a gain controller when used in conjunction with a known teleconferencing bridge.

DESCRIPTION OF THE PREFERRED EMBODIMENT

Referring to the single FIGURE, the gain controller basically comprises common monitoring circuitry 10, the output of which is connected to individual channel control circuitry 11.

In this embodiment, up to six remote telephone stations T1 to T6 may be connected through a central office CO, 2-wire to 4-wire hybrids H1 to H6 and gain control amplifiers A1 to A6 to the input and output ports of a teleconferencing bridge 12. In addition, a control telephone T9 is also connected through a 2-wire to 4-wire hybrid H9 to the bridge 12. The details of the structure of the gain controller will become apparent from the following description of its function and operation.

To initiate a call to the remote station T1, the operator at the controlling station T9 is connected through the bridge 12, and hybrid H1 to the central office CO. When the call is dialled, the line L1 is connected in a well-known manner to the station T1. At this point, the amplifier A1 has unity (0 dB) gain. Once the call is established, the conferee at the distant telephone T1 is requested to actuate one of the push-botton signalling tones (which are normally used for dialing) for a minimum period of three seconds. This tone signal is coupled from the output of the amplifier A1 to the input of an analog multiplexer 13. Concurrently, the controlling operator selects channel 1 of an address generator 14 which transmits a 3-bit binary address signal to both the analog multiplexer 13 and a clock demultiplexer 15. When the controlling operator hears the received signalling tone, she operates a normalization key 16 which actuates a 3-second single-shot multivibrator 17. This opens a gate in the multiplexer 13 which couples the signal from the input channel 1 to a signal detector 20, the output of which is coupled through an integrator 21 to a voltage level detector 22. When the output of the integrator 21 reaches that of the voltage reference $V_{REF}$ in the level detector 22, it generates a time dependent output signal, which is coupled to the input of an AND gate 23. Operation of the signal-shot multivibrator 17 also starts a 500 Hz clock signal which is coupled from a clock 25 through the AND gate 23 to the input of the clock demultiplexer 15. This clock signal is directed by the channel address to an 8-bit binary counter C1. This condition continues until the time dependent output signal closes the AND gate 23 thereby removing the signal from the clock generator 25 to the 8-bit counter C1. Consequently, the binary signal stored in the 8-bit counter is proportional to the magnitude of the tone signal from the distant telephone T1. This stored signal is then converted by a simple digital to analog convertor D1 to an analog signal which is utilized to alter the gain of the amplifier A1 so as to normalize its output signal level. This procedure is repeated by the control operator in establishing separate contact with each of the remote stations T2–T6 connected to the teleconferencing bridge 12. Once separate contact to each of the stations has been established, all stations can be connected through the teleconferencing bridge 12 in a well-known manner. If for any reason the controlling operator wishes to return any or all of the channels to its original state, i.e. to 0 dB gain of any or all of the channel amplifiers, this can be readily done by actuating the appropriate clear switch which is coupled through one of the OR gates 30 and resets the associated counter C1 to C6.

What is claimed is:

1. A gain controller for normalizing signal levels from a plurality of remote stations, each of which is connected to a teleconferencing bridge; the gain controller comprising:
   a signal multiplexer for connecting a test signal from one of the remote stations to a signal level detector in response to a selected channel address to generate a control signal which is proportional to the level of the test signal;
   a demultiplexer responsive to the selected channel address for connecting the control signal to a storage circuit associated with said one remote signal;
   an address generator for transmitting the selected channel address to the multiplexer and demultiplexer; and
   separate variable gain amplifiers connecting each of the remote stations to the teleconferencing bridge, means for utilizing the control signal in the storage circuit associated with said one remote station to control the variable gain amplifier connecting said one remote station to the teleconferencing bridge, so that the gain of each amplifier is proportional to the magnitude of the control signal stored in the storage circuit so as to normalize the gain of the channels connected to the teleconferencing bridge.

2. A gain controller for normalizing signal levels from a plurality of remote called stations with respect to that of a calling station, each of which is connected to a teleconferencing bridge; the gain controller comprising:
   a signal multiplexer for connecting a test signal from a selected one of the remote called stations to a signal level detector in response to a selected channel address to generate a time dependent signal, the time dependent signal having a period which is proportional to the level of said test signal;
   means responsive to the time dependent signal for connecting a clock signal to a clock demultiplexer for said period thereof;
   the clock demultiplexer connecting the clock signal to a storage counter associated with the selected called station in response to the selected channel address;
   means for transmitting the selected channel address to the multiplexer and demultiplexer;
   a separate variable gain amplifier connecting each remote called station to the teleconferencing bridge, means for utilizing the control signal in the storage circuit associated with said one remote station to control the variable gain amplifier connecting said one remote station to the teleconferencing bridge, so that the gain of each amplifier is proportional to the count of the clock signal stored in the associated counter so as to normalize the gain of the channels connected to the teleconferencing bridge.

3. A gain controller as defined in claim 2 in which the test signal is a push-button signalling tone.

4. A gain controller as defined in claim 2 in which the period of the time delay signal is directly proportional to the magnitude of the received test signal, and the gain of the variable gain amplifier is inversely proportional to the count of the clock signal stored in the associated counter.

* * * * *